US012621320B2

(12) United States Patent
Thomsen

(10) Patent No.: US 12,621,320 B2
(45) Date of Patent: May 5, 2026

(54) SYSTEMS, METHODS, AND APPARATUSES FOR DETERMINING RESOURCE MISAPPROPRIATION BASED ON DISTRIBUTION FREQUENCY IN AN ELECTRONIC NETWORK

(71) Applicant: BANK OF AMERICA CORPORATION, Charlotte, NC (US)

(72) Inventor: Kevin Patrick Thomsen, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 209 days.

(21) Appl. No.: 18/073,003

(22) Filed: Dec. 1, 2022

(65) Prior Publication Data

US 2024/0187432 A1 Jun. 6, 2024

(51) Int. Cl.
H04L 9/40 (2022.01)

(52) U.S. Cl.
CPC ........ H04L 63/1425 (2013.01); H04L 63/102 (2013.01)

(58) Field of Classification Search
CPC .......................... H04L 63/1425; H04L 63/102
See application file for complete search history.

(56) References Cited

U.S. PATENT DOCUMENTS

| | | | |
|---|---|---|---|
| 6,452,492 B1 | 9/2002 | Drury | |
| 7,995,791 B2 | 8/2011 | Flook | |
| 8,095,610 B2 | 1/2012 | Gould | |
| 8,186,578 B1 | 5/2012 | Block | |
| 8,395,500 B1 | 3/2013 | Dent | |
| 8,589,298 B2 * | 11/2013 | Choudhuri | ............ G06Q 40/00 705/30 |
| 8,606,712 B2 * | 12/2013 | Choudhuri | ........... G06Q 30/018 705/30 |

(Continued)

FOREIGN PATENT DOCUMENTS

| | | |
|---|---|---|
| AU | 2021104947 A4 | 4/2022 |
| CN | 104091391 A | 10/2014 |
| CN | 109427118 A | 3/2019 |

*Primary Examiner* — Farid Homayounmehr
*Assistant Examiner* — Mudasiru K Olaegbe
(74) *Attorney, Agent, or Firm* — Moore & Van Allen PLLC; Lauren M. Stokes

(57) ABSTRACT

Systems, computer program products, and methods are described herein for determining resource misappropriation based on distribution frequency. The present disclosure is configured to receive, from a plurality of resource distribution devices, a user interaction frequency, wherein the user interaction frequency comprises a plurality of user interactions over a predetermined time period, and wherein each of the plurality of user interactions comprises a resource distribution request from an account associated with a user; store the plurality of user interactions; compare the user interaction frequency with a user frequency threshold, wherein the user frequency threshold comprises a predetermined user interaction threshold over the predetermined time period; determine, based on the user frequency threshold, whether the user interaction frequency meets or exceeds the user frequency threshold; and generate, based on the user interaction frequency meeting or exceeding the user frequency threshold, an alert interface component.

20 Claims, 7 Drawing Sheets

(56)         References Cited

U.S. PATENT DOCUMENTS

| | | | | |
|---|---|---|---|---|
| 8,639,567 | B2 | 1/2014 | Winters | |
| 8,769,133 | B2 | 7/2014 | Hayward | |
| 8,988,186 | B1 | 3/2015 | Dent | |
| 9,838,373 | B2 * | 12/2017 | Turgeman | G06F 3/04883 |
| 10,504,123 | B2 | 12/2019 | Joao | |
| 10,587,633 | B2 * | 3/2020 | Muddu | H04L 63/1441 |
| 10,672,001 | B2 | 6/2020 | Hammad | |
| 10,885,751 | B2 * | 1/2021 | Hazard | G06Q 20/4097 |
| 10,929,923 | B1 * | 2/2021 | Nguyen | G06Q 40/03 |
| 10,949,514 | B2 * | 3/2021 | Turgeman | G06Q 20/401 |
| 11,100,205 | B2 | 8/2021 | Burri | |
| 2005/0151639 | A1 | 7/2005 | Bulmer | |
| 2005/0268113 | A1 * | 12/2005 | Mahone | H04L 43/00 |
| | | | | 713/189 |
| 2013/0024376 | A1 * | 1/2013 | Choudhuri | G06Q 20/4016 |
| | | | | 705/44 |
| 2017/0004506 | A1 | 1/2017 | Steinman | |
| 2017/0323378 | A1 * | 11/2017 | Dintenfass | G06Q 30/0201 |
| 2018/0160309 | A1 * | 6/2018 | Turgeman | G06F 3/041 |
| 2018/0247483 | A1 | 8/2018 | Lindsay | |
| 2020/0177689 | A1 * | 6/2020 | Sellers | G06Q 30/0226 |
| 2020/0184435 | A1 * | 6/2020 | Castinado | G06F 21/31 |
| 2020/0242600 | A1 * | 7/2020 | Stack | H04W 12/062 |
| 2021/0110014 | A1 * | 4/2021 | Turgeman | G06F 11/3419 |
| 2022/0321586 | A1 * | 10/2022 | Sims | H04L 63/1425 |
| 2024/0039935 | A1 * | 2/2024 | Rudraraju | H04L 63/1425 |

* cited by examiner

140

156

162

164

166

170

160

152

158

168

154

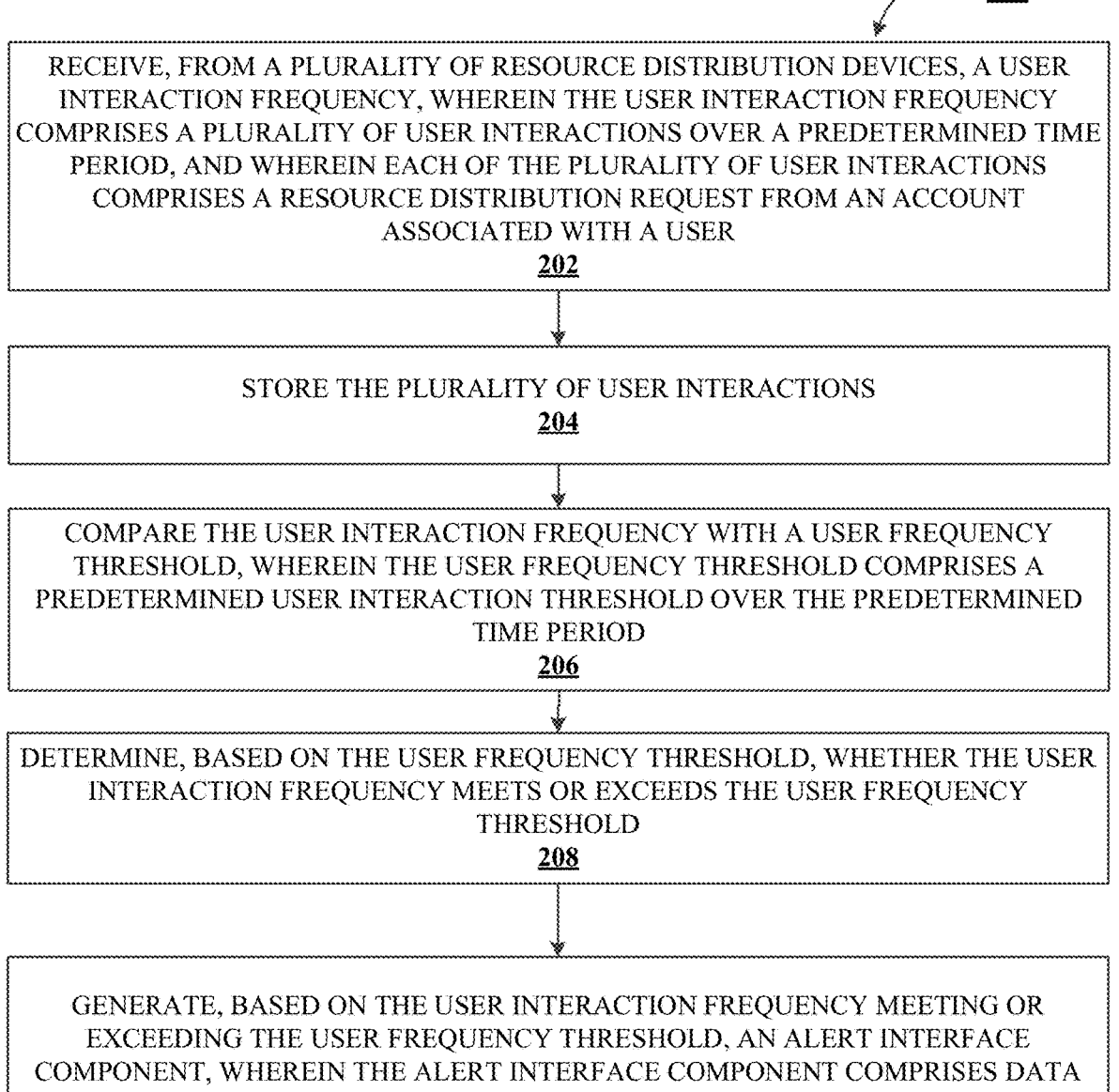

200

RECEIVE, FROM A PLURALITY OF RESOURCE DISTRIBUTION DEVICES, A USER INTERACTION FREQUENCY, WHEREIN THE USER INTERACTION FREQUENCY COMPRISES A PLURALITY OF USER INTERACTIONS OVER A PREDETERMINED TIME PERIOD, AND WHEREIN EACH OF THE PLURALITY OF USER INTERACTIONS COMPRISES A RESOURCE DISTRIBUTION REQUEST FROM AN ACCOUNT ASSOCIATED WITH A USER
202

STORE THE PLURALITY OF USER INTERACTIONS
204

COMPARE THE USER INTERACTION FREQUENCY WITH A USER FREQUENCY THRESHOLD, WHEREIN THE USER FREQUENCY THRESHOLD COMPRISES A PREDETERMINED USER INTERACTION THRESHOLD OVER THE PREDETERMINED TIME PERIOD
206

DETERMINE, BASED ON THE USER FREQUENCY THRESHOLD, WHETHER THE USER INTERACTION FREQUENCY MEETS OR EXCEEDS THE USER FREQUENCY THRESHOLD
208

GENERATE, BASED ON THE USER INTERACTION FREQUENCY MEETING OR EXCEEDING THE USER FREQUENCY THRESHOLD, AN ALERT INTERFACE COMPONENT, WHEREIN THE ALERT INTERFACE COMPONENT COMPRISES DATA ASSOCIATED WITH THE USER INTERACTION FREQUENCY
210

FIGURE 2

DETERMINE, BASED ON A PREDETERMINED TOTAL RESOURCE THRESHOLD, WHETHER THE TOTAL RESOURCE VALUE OF THE PLURALITY OF USER INTERACTIONS MEETS OR EXCEEDS THE PREDETERMINED TOTAL RESOURCE THRESHOLD
402

GENERATE, BASED ON THE DETERMINATION THAT THE TOTAL RESOURCE VALUE OF THE PLURALITY OF USER INTERACTIONS MEETS OR EXCEEDS THE PREDETERMINED TOTAL RESOURCE THRESHOLD, A TOTAL RESOURCE INTERFACE COMPONENT, THE TOTAL RESOURCE INTERFACE COMPONENT COMPRISING DATA ASSOCIATED WITH THE TOTAL RESOURCE VALUE OF THE PLURALITY OF USER INTERACTIONS
404

TRANSMIT, TO A THIRD-PARTY DEVICE, THE TOTAL RESOURCE INTERFACE COMPONENT, WHEREIN THE TOTAL RESOURCE INTERFACE COMPONENT CONFIGURES A GRAPHICAL USER INTERFACE OF THE THIRD-PARTY DEVICE, AND WHEREIN THE THIRD-PARTY DEVICE IS ASSOCIATED WITH AT LEAST ONE OF THE USER, A MANAGER, OR AN AGENCY
406

FIGURE 4

SYSTEMS, METHODS, AND APPARATUSES FOR DETERMINING RESOURCE MISAPPROPRIATION BASED ON DISTRIBUTION FREQUENCY IN AN ELECTRONIC NETWORK

TECHNOLOGICAL FIELD

Example embodiments of the present disclosure relate to determining resource misappropriation based on distribution frequency in an electronic network.

BACKGROUND

Determining resource misappropriation is the process of receiving, storing, and comparing data received from user resource distribution requests. Determining resource misappropriation is crucial for providing a way to receive resource distribution requests securely and effectively, and for ensuring security and accuracy in users' interactions. Managers of entities providing resource distributions have a harder time than ever providing secure, effective, and accurate resource distributions to users because managers of the entities cannot confirm whether certain resource distribution requests are indeed intended by the user associated with the user account. A challenge arises in determining whether a resource distribution request by a user was of the user's own free will or at the command of another.

Applicant has identified a number of deficiencies and problems associated with resource misappropriation within the scope of distribution frequency in an electronic network. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for determining resource misappropriation based on distribution frequency in an electronic network.

In one aspect, a system for determining resource misappropriation based on distribution frequency in an electronic network is provided. The system comprising: at least one memory device with computer-readable program code stored thereon; at least one communication device; at least one processing device operatively coupled to the at least one memory device and the at least one communication device, wherein executing the computer-readable code is configured to cause the at least one processing device to: receive, from a plurality of resource distribution devices, a user interaction frequency, where in the user interaction frequency comprises a plurality of user interactions over a predetermined time period, wherein each of the plurality of user interactions comprises a resource distribution request from an account associated with a user; store the plurality of user interactions; compare the user interaction frequency with a user frequency threshold, wherein the user frequency threshold comprises a predetermined user interaction threshold over the predetermined time period; determine, based on the user frequency threshold, whether the user interaction frequency meets or exceeds the user frequency threshold; and generate, based on the user interaction frequency meeting or exceeding the user frequency threshold, an alert interface component, wherein the alert interface component comprises data associated with the user interaction frequency.

In some embodiments, wherein the predetermined user interaction threshold comprises at least one of one interaction, two interactions, three interactions, four interactions, or five interactions.

In some embodiments, wherein data associated with the plurality of user interactions comprises a resource value of each interaction.

In some embodiments, wherein the processing device is configured to determine a total resource value of the plurality of user interactions, and wherein the total resource value is based on each of the resource value of each interaction.

In some embodiments, wherein the processing device is further configured to: determine, based on a predetermined total resource threshold, whether the total resource value of the plurality of user interactions meets or exceeds the predetermined total resource threshold; generate, based on the determination that the total resource value of the plurality of user interactions meets or exceeds the predetermined total resource threshold, a total resource interface component, the total resource interface component comprising data associated with the total resource value of the plurality of user interactions; and transmit, to a third-party device, the total resource interface component, wherein the total resource interface component configures a graphical user interface of the third-party device, and wherein the third-party device is associated with at least one of the user, a manager, or an agency.

In some embodiments, wherein each of the plurality of user interactions comprises a request for a resource distribution.

In some embodiments, wherein at least one user interaction of the plurality of user interactions comprises an attempt for a resource distribution.

In some embodiments, wherein the account associated with the user comprises a plurality of resource distribution accounts.

In some embodiments, wherein each resource distribution of the plurality of the resource distribution accounts is associated with a plurality of resource distribution instruments.

In some embodiments, wherein the processing device is further configured to transmit, to a third-party device, the alert interface component, wherein the alert interface component configures a graphical user interface of the third-party device.

In some embodiments, wherein the third-party device comprises a plurality of third-party devices.

In another aspect, a computer program product for determining resource misappropriation based on distribution frequency, wherein the computer program product comprises at least one non-transitory computer-readable medium having computer-readable program code portions embodied therein, the computer-readable program code portions which when executed by a processing device are configured to cause the processor to: receive, from a plurality of resource distribution devices, a user interaction frequency, wherein the user interaction frequency comprises a plurality of user interactions over a predetermined time period, and wherein each of the plurality of user interactions comprises a resource distribution request from an account associated with a user; store the plurality of user interactions; compare the user interaction frequency with a user frequency threshold, wherein the user frequency threshold comprises a predetermined user interaction threshold over the predetermined time period; determine, based on the user frequency threshold, whether the user interaction frequency meets or exceeds the user frequency threshold; and generate, based on the user interaction frequency meeting or exceeding the user frequency threshold, an alert interface component, wherein the alert interface component comprises data associated with the user interaction frequency.

In yet another aspect, computer-implemented method for determining resource misappropriation based on distribution frequency, the computer-implemented method comprising: receiving, from a plurality of resource distribution devices, a user interaction frequency, wherein the user interaction frequency comprises a plurality of user interactions over a predetermined time period, wherein each of the plurality of user interactions comprises a resource distribution request from an account associated with a user; storing the plurality of user interactions; comparing the user interaction frequency with a user frequency threshold, wherein the user frequency threshold comprises a predetermined user interaction threshold over the predetermined time period; determining, based on the user frequency threshold, whether the user interaction frequency meets or exceeds the user frequency threshold; and generating, based on the user interaction frequency meeting or exceeding the user frequency threshold, an alert interface component, wherein the alert interface component comprises data associated with the user interaction frequency.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
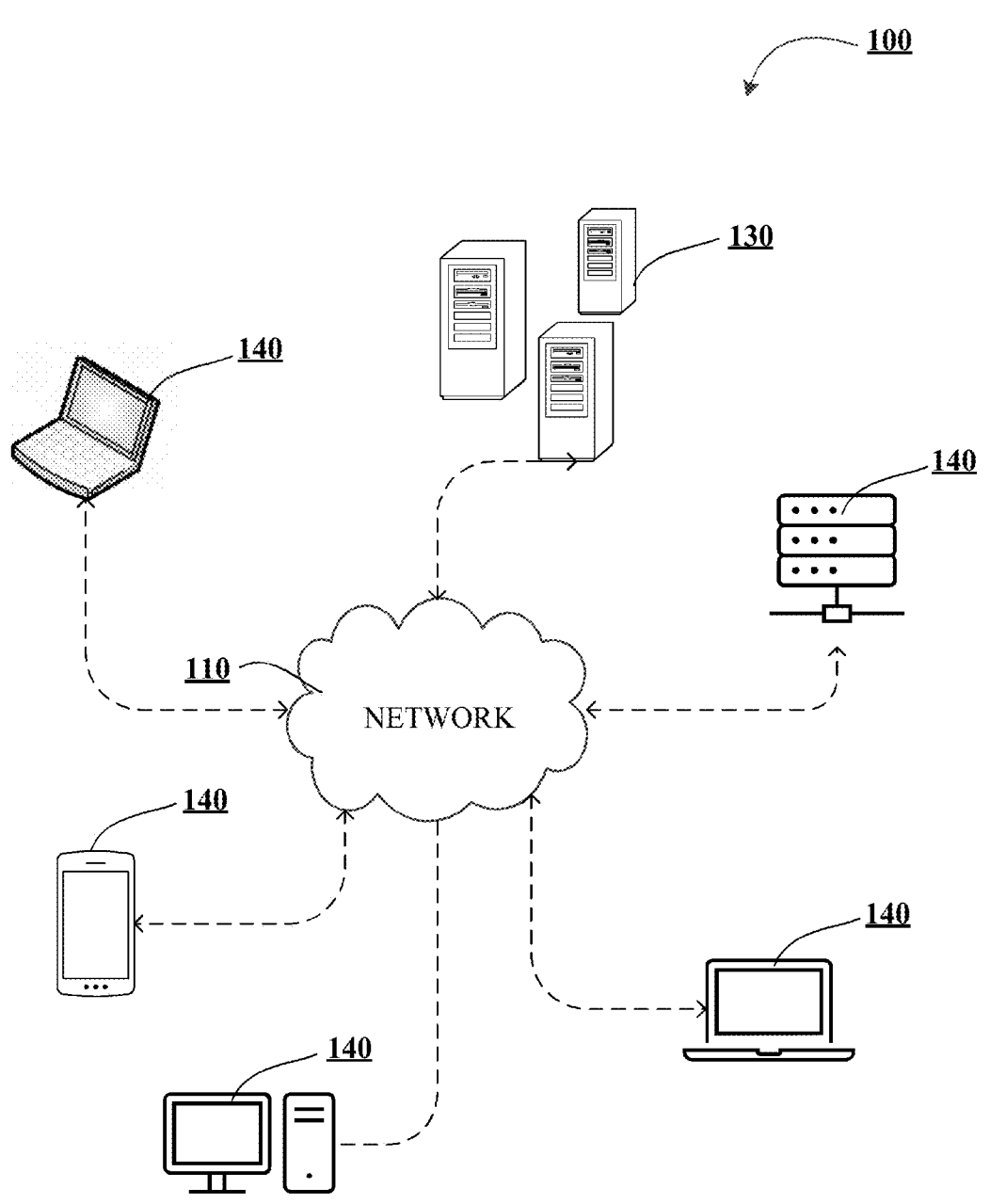
Figure 1B:
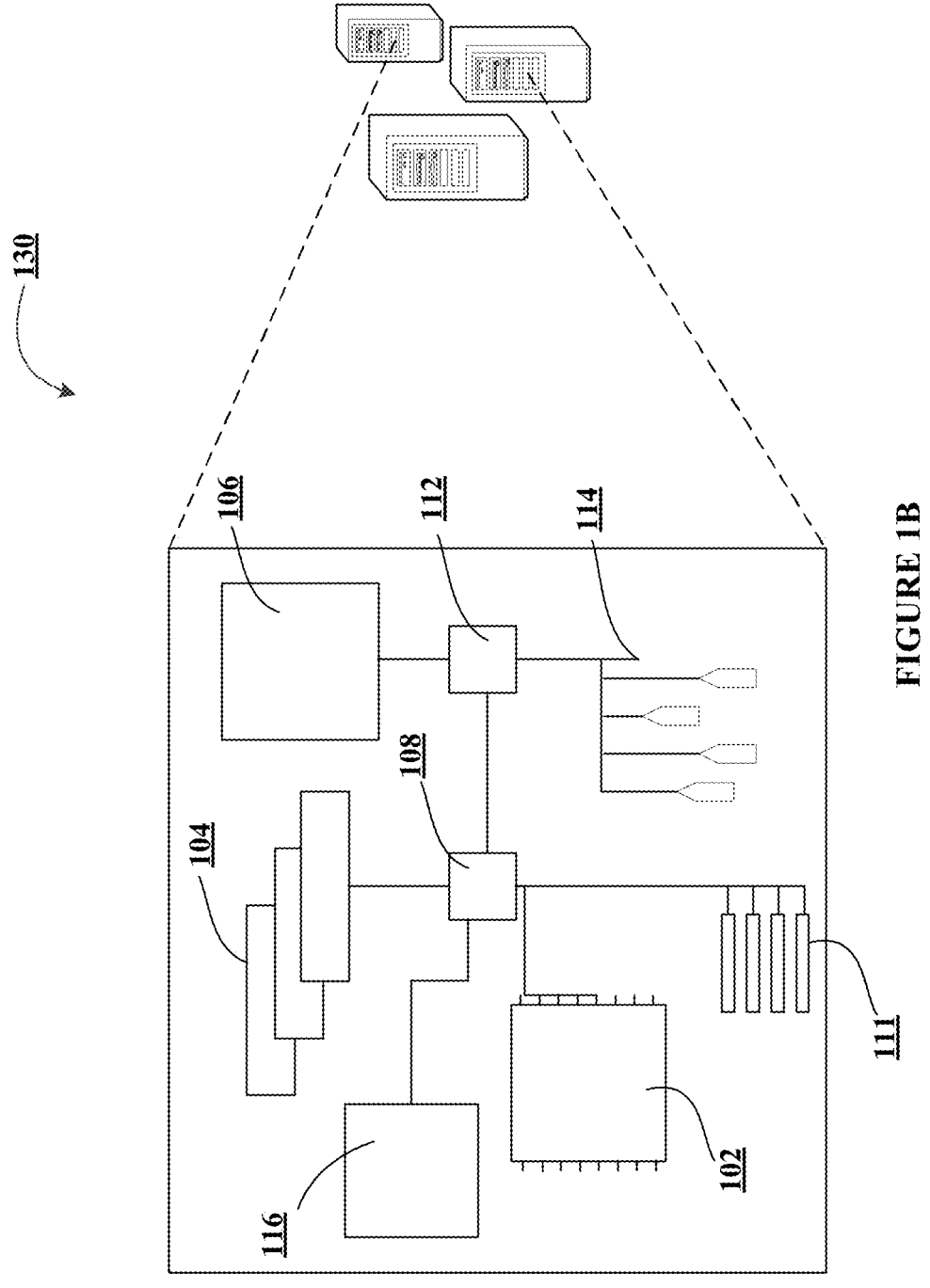
Figure 1C:
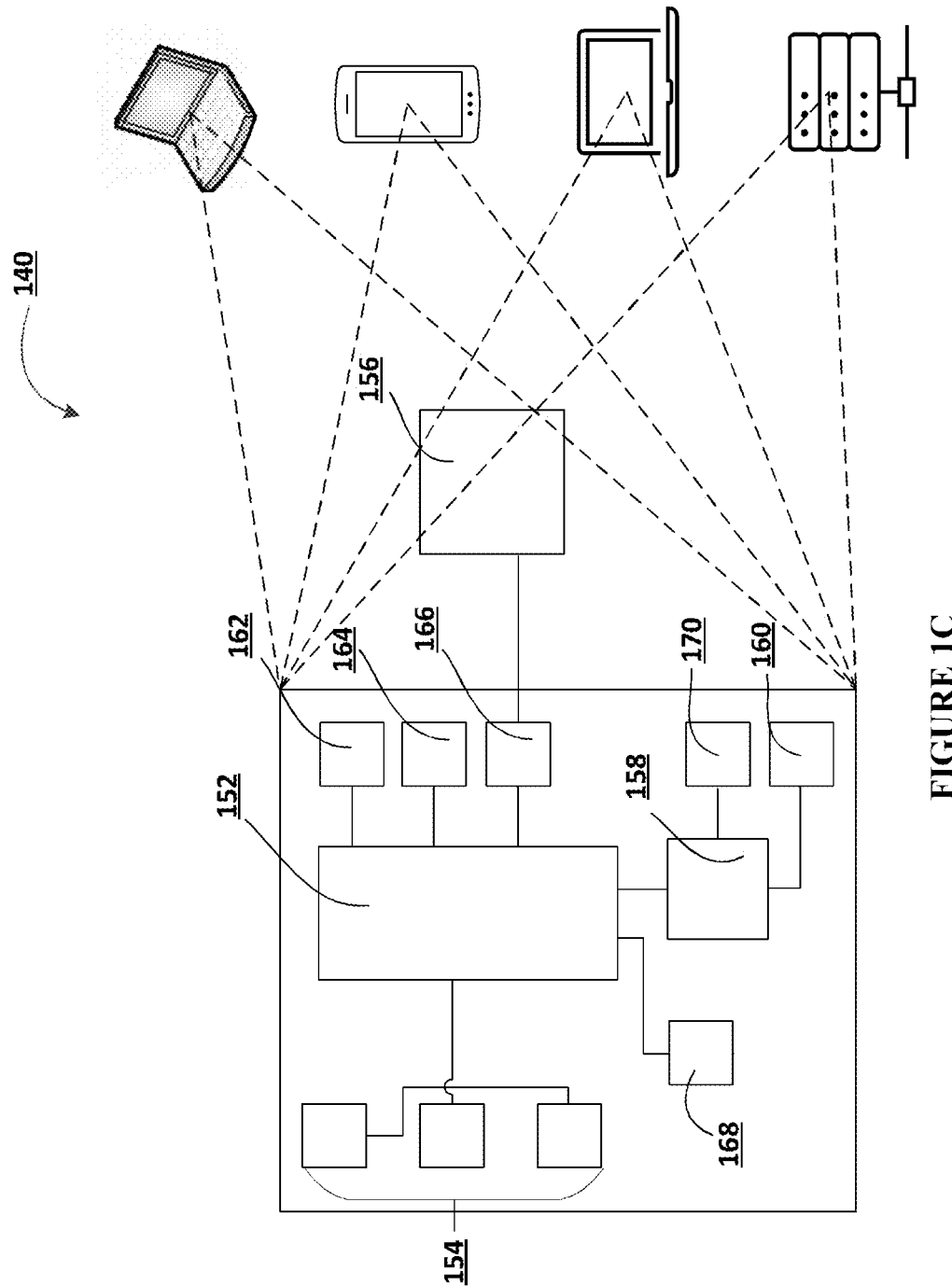

FIGS. 1A-1C illustrates technical components of an exemplary distributed computing environment for determining resource misappropriation based on distribution frequency in an electronic network, in accordance with an embodiment of the disclosure.

FIG. 2 illustrates a process flow for determining resource misappropriation based on distribution frequency in an electronic network, in accordance with an embodiment of the disclosure.

Figure 3:
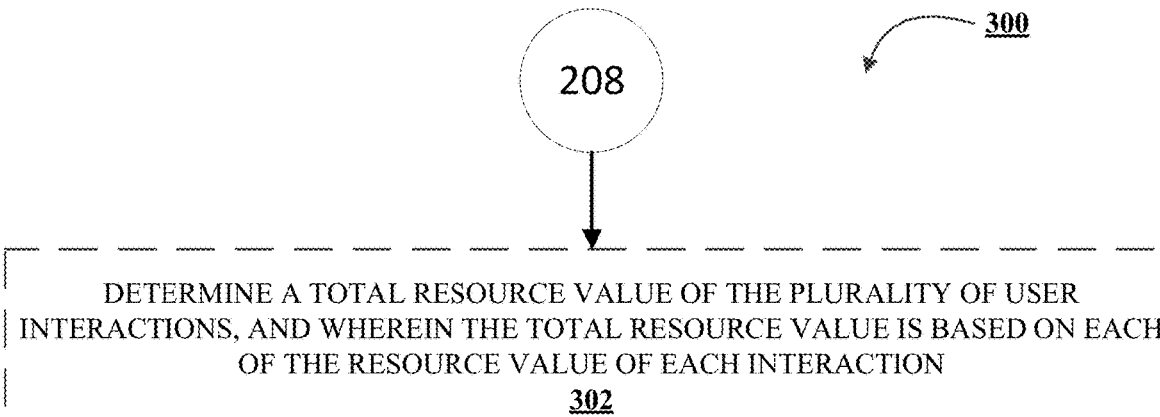

FIG. 3 illustrates a process flow for determining a total resource value of the plurality of user interactions, in accordance with an embodiment of the disclosure.

FIG. 4 illustrates a process flow for transmitting the total resource interface component, in accordance with an embodiment of the disclosure.

Figure 5:
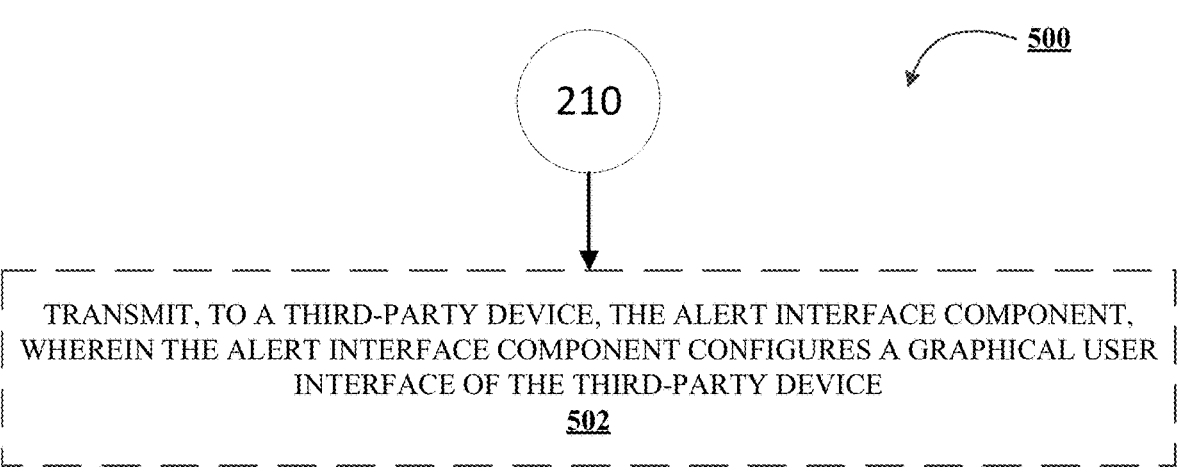

FIG. 5 illustrates a process flow for transmitting the alert interface component, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system.

In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "resource transfer," "resource distribution," "distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In some embodiments, "payment instrument" may refer to a debit car, a credit card, a check, a money order, a cashier's check, an electronic fund transfer (ETF), and/or the like.

As described in further detail herein, the present invention provides a solution to the above-referenced problems in the field of technology by generating a secure, accurate, and efficient process for determining resource misappropriation based on distribution frequency in an electronic network. The present invention solves this technical problem by implementing a system for determining resource misappropriation, like that shown as a distribution frequency system 130 in FIGS. 1A-1C. For instance, the distribution frequency system acts to determine resource misappropriation based on the frequency of the user's distribution requests—in real-time—at a resource distribution device by receiving a plurality of user interactions with at least one resource distribution device. Further, the distribution frequency system acts to dynamically store and compare any number of user interactions over a predetermined time period with a user frequency threshold. In addition, the distribution frequency system acts to generate an alert where the number of user interactions is determined to meet or exceed the predetermined user interaction threshold, or where the total resource value meets or exceeds the predetermined total resource threshold. Thus, the distribution frequency system for determining resource misappropriation provides a technical solution to the technical problem in securely, accurately, and efficiently determining resource misappropriation.

Users associated with resource distribution entities (e.g., financial institutions and/or the like) are in greater danger than ever in securely requesting resource distributions at resource distribution devices. Wrongdoers can easily impose their will over a user attempting to request resources. A challenge arises in determining whether a resource distribution request by a user was of the user's own free will or at the command of another. The classification of resource distributions as misappropriations has a large implication for the user and the user's account. Resource distributions that are not classified as a misappropriation, but should be, can have negative consequences regarding the reliability and the relationship between the user and the resource distribution entity (e.g., financial institution). In addition, when a resource distribution is determined to be a misappropriation, the user may not know what next steps to take because of the events leading up to the misappropriation. Without a system that detects and responds to misappropriations, a user's account becomes comprised. A need, therefore, exists for determining resource misappropriation, and for generating alerts that can be transmitted to a third party once a misappropriation happens.

Embodiments of the present disclosure provide for determining resource misappropriation based on distribution frequency in an electronic network. In this regard, and by way of non-limiting example, the distribution frequency system may receive a number of user interactions from a user attempting to withdraw cash from a resource distribution device (e.g., an automated teller machine (ATM)) from the user's account associated with a financial institution. Additionally, or alternatively, the distribution frequency system may store the interaction between the user and the resource distribution device. Additionally, or alternatively, the distribution frequency system may compare the user's interaction at the resource distribution device with a predetermined number of interactions. In this regard, and by way of non-limiting example, the comparison comprises comparing the number of user interactions (e.g., withdrawals) over a specified time period with a user frequency threshold (e.g., a predetermined number of user interactions over a specified time period). Additionally, or alternatively, the distribution frequency system may determine whether the user interaction frequency (e.g., the number of user interactions over the specified time period) meets or exceeds the user frequency threshold. Additionally, or alternatively, if the user interaction frequency meets or exceeds the user frequency threshold, the distribution frequency system may generate an alert. By way of non-limiting example, the alert may comprise data associated with the user interactions.

Accordingly, the system for determining resource misappropriation based on distribution frequency in an electronic network works by receiving a user interaction frequency; storing the plurality of user interactions; comparing the user interaction frequency with a user frequency threshold; determining whether the user interaction frequency meets or exceeds the user frequency threshold; and generating an alert interface component.

What is more, the present disclosure provides a technical solution to a technical problem. As described herein, the technical problem includes the accurate and effective determination of resource misappropriation based on distribution frequency in an electronic network, which is thus necessary to promote the security of electronic accounts, data, and the like. The technical solution presented herein allows for a determination of resource misappropriation which allows for dynamic, accurate, and secure determination of whether misappropriation is likely (which may include attempts to request resource distribution which would otherwise not be used in the determination). In particular, determining resource misappropriation based on distribution frequency is an improvement over existing solutions to the accurately and effectively determine resource misappropriation, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for determining resource misappropriation based on distribution frequency in an electronic network 100, in accordance with an embodiment of the disclosure. As shown in FIG. 1A, the distributed computing environment 100 contemplated herein may include a system 130 (e.g., a distribution frequency system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low-speed port 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for determining resource misappropriation based on distribution frequency in an electronic network, in accordance with an embodiment of the invention. In some embodiments, a distribution frequency system (e.g., similar to one or more of the systems described herein with respect to FIGS. 1A-1C) may perform one or more of the steps of process flow 200. For example, a distribution frequency system (e.g., the system 130 described herein with respect to FIGS. 1A-1C) may perform the steps of process flow 200.

As shown in block 202, the process flow 200 may include the step of receiving, from a plurality of resource distribution devices, a user interaction frequency, wherein the user interaction frequency comprises a plurality of user interactions over a predetermined time period, and wherein each of the plurality of user interactions comprises a resource distribution request from an account associated with a user. In some embodiments, a plurality of resource distribution devices can be one or more resource distribution devices. In some embodiments, resource distribution devices can be automated teller machines (ATMs), financial terminals, devices that can access user accounts, and/or the like. In some embodiments, the resource distribution devices may be any resource distribution devices, regardless of which resource distribution entity (e.g., financial institution) they are associated. In some embodiments, the resource distribution devices may be associated with a resource distribution entity (e.g., financial institution) other than the one where the user maintains the user's account.

As used herein, a user interaction frequency comprises a plurality of user interactions over a predetermined time period. In some embodiments, the user interactions may comprise a resource distribution request. In some embodiments, the plurality of user interactions may comprise one or more user interactions at a resource distribution device. In some embodiments, the plurality of user interactions may comprise a user interacting (e.g., using, communicating with, connecting with, and/or the like) a resource distribution device.

In some embodiments, the distribution frequency system may receive the plurality of user interactions from the user interacting with the plurality of resource distribution devices. In some embodiments, the user may interact with a user device (e.g., a mobile telephone, a personal computer, an electronic tablet, and/or the like). In some embodiments, the user device may transmit the user interaction data to the distribution frequency system over a network (e.g., network 110 of FIGS. 1A-1C). In some embodiments, the distribution frequency system may receive the user interaction data from the network (e.g., network 110 of FIGS. 1A-1C) through a communication device (e.g., a networking device coupled with the low-speed expansion port 114). In some embodiments, the user device may not be the real user's own device, but may be a user device of another entity (e.g., a public device, a terminal, a kiosk, and/or the like). In some embodiments, the user interaction may not be from the real user associated with the user account but may be from another party taking control of the user account through force, coercion, misrepresentation, and/or the like.

As used herein, the predetermined time period may refer to a specified time period over which the plurality of user interactions is compared with a predetermined user interaction threshold. In some embodiments, the predetermined time period may be determined (e.g., pre-determined) by a resource distribution entity (e.g., financial institution) associated with the user's account. In some embodiments, the predetermined time period may be predetermined by the resource distribution device's manager. In some embodiments, the predetermined time period may be predetermined by the user. In some embodiments, the predetermined time period may be predetermined by a third-party entity such as an agency (e.g., the local police, state investigation agencies, the Federal Bureau of Investigation (FBI), the Securities and Exchange Commission (SEC), and/or the like). In some embodiments, the predetermined time period may be predetermined by federal law or regulation, state law or regulation, local law or regulation, and/or the like. In some embodiments, the predetermined time period may be any amount of time (e.g., seconds, minutes, hours, days, weeks, years, or any combination of time). In some embodiments, the predetermined time period may be 15 minutes. In some embodiments, the predetermined time period may be five minutes, 30 minutes, one hour, two hours, three hours, 12 hours, 24 hours and/or the like.

In some embodiments, the predetermined time period may, from time to time, be reevaluated (e.g., reset to a different time period) by the same entity that initially set the predetermined time period. In some embodiments, the predetermined time period may, from time to time, be reevaluated (e.g., reset to a different time period) by another entity different than the one that initially set the predetermined time period.

In some embodiments, the resource distribution request may refer to when the user is requesting resources from the user's account (e.g., withdrawing resources, transferring resources, and/or the like). In some embodiments, the resource distribution request may be from an account associated with the user. In some embodiments, the resource distribution request may comprise the user requesting resource distributions across a plurality of user accounts. In some embodiments, the account associated with the user may comprise a plurality of resource distribution accounts. In some embodiments, the plurality of user resource distribution accounts may comprise checking accounts, savings accounts, business accounts, investment accounts, and/or the like. For instance, and by way of non-limiting example, a user may have multiple different types of accounts associated with a resource distribution entity (e.g., financial institution). In some embodiments, the plurality of the resource distribution accounts may be associated with a plurality of payment instruments (e.g., a debit card, a credit card, a check, a money order, a cashier's check, an electronic funds transfer, and/or the like).

In some embodiments, if a user interacts with any number of the user's accounts, through any type of payment instrument, each of the interactions may be received by the distribution frequency system. In some embodiments, the distribution frequency system may receive each of the interactions through the distribution frequency system's communication device (e.g., a networking device coupled with the low-speed expansion port 114). For instance, and by way of non-limiting example, a user may have a checking account, a savings account, and a business account and may interact with each of them within the predetermined time period.

In some embodiments, the resource distribution request may refer to when the user is transferring resources between accounts (e.g., between accounts owned by the user or between one of the user's accounts and a third-party's account). In some embodiments, a resource distribution request may refer to when the user is paying for goods or services from one of the user's accounts.

In some embodiments, the resource distribution request may refer to an attempted request for resource distributions. As used herein, an attempted request for resource distributions may refer to a distribution of resources that is not completed. In some embodiments, the user may attempt to request a resource distribution that ultimately fails for any number of reasons (e.g., inadequate funds in the user account, incorrect recipient information, incorrect user credentials entered, and/or the like). For instance, and by way of non-limiting example, if the user attempts to transfer resources between accounts but provides the incorrect recipient information, the attempted transfer of resources, though incomplete, may still be included as a resource distribution request. In some embodiments, the user may attempt an interaction a plurality of times.

In some embodiments, the distribution frequency system 130 may receive the plurality of user interactions over the network 110. In some embodiments, the distribution frequency system 130 may receive the plurality of user interactions from the network 110 through the low-speed expansion port 114. In some embodiments, the network 110 may receive the plurality of user interactions from an end-point device 140. In some embodiments, the end-point device 140 may communicate with the network 110 through the communication interface 158.

As shown in block 204, the process flow 200 may include the step of storing the plurality of user interactions. As used herein, storing may comprise retaining or entering any and all information related to the plurality of user interactions. In some embodiments, the stored plurality of user interactions may be used to determine when the predetermined user interaction threshold is reached within the predetermined time period. In some embodiments, the plurality of user interactions may be stored based on the user's account being associated with a resource distribution entity (e.g., financial institution). In some embodiments, the distribution frequency system may continuously receive and store the plurality user interactions over a time period that exceeds the predetermined time period. In some embodiments, the plurality of user interactions may be stored whenever the user interacts with the user's own account. In some embodiments, the plurality of user interactions may be stored regardless of the amount of resources being requested from the user's account.

In some embodiments, the plurality of user interactions may be stored in the memory 104 within the distribution frequency system 130. In some embodiments, the plurality of user interactions may be stored in the storage device 106 within the distribution frequency system 130.

As shown in block 206, the process flow 200 may include the step of comparing the user interaction frequency with a user frequency threshold, wherein the user frequency threshold comprises a predetermined user interaction threshold over the predetermined time period. In some embodiments, "comparing" may mean determining whether the number of user interactions is equal to or greater than the predetermined user interaction threshold. In some embodiments, "comparing" may mean determining whether the resource value of the user interactions is equal to or greater than the predetermined total resource threshold.

As used herein, a "predetermined user interaction threshold" may refer to a specified number of user interactions. As used herein, the "user frequency threshold" may refer to the predetermined user interaction threshold over the predetermined time period.

In some embodiments, the predetermined user interaction threshold may be determined (e.g., pre-determined) by a resource distribution entity (e.g., financial institution) associated with the user's account. In some embodiments, the predetermined user interaction threshold may be predetermined by the resource distribution device's manager. In some embodiments, the predetermined user interaction threshold may be predetermined by the user. In some embodiments, the predetermined user interaction threshold may be predetermined by a third-party entity such as an agency (e.g., the local police, state investigation agencies, the Federal Bureau of Investigation (FBI), the Securities and Exchange Commission (SEC), and/or the like). In some embodiments, the predetermined user interaction threshold may be predetermined by federal law or regulation, state law or regulation, local law or regulation, and/or the like.

In some embodiments, the predetermined user interaction threshold may, from time to time, be reevaluated (e.g., reset to a different user interaction threshold) by the entity that initially set the predetermined user interaction threshold. In some embodiments, the predetermined user interaction threshold may, from time to time, be reevaluated (e.g., reset to a different user interaction threshold) by another entity different than the one that initially set the predetermined user interaction threshold.

In some embodiments, the predetermined user interaction threshold may comprise any number of interactions. In some embodiments, the predetermined user interaction threshold may comprise at least a specified number of interactions. In some embodiments, the predetermined user interaction threshold may comprise at least one of one interaction, two interactions, three interactions, four interactions, five interactions, six interactions, seven interactions, eight interactions, nine interactions, or ten interactions.

In some embodiments, the distribution frequency system 130 may compare the user frequency threshold with the plurality of user interactions within the processor 102.

As shown in block 208, the process flow 200 may include the step of determining, based on the user frequency threshold, whether the user interaction frequency meets or exceeds the user frequency threshold. As used herein, "meet" may encompass a variety of definitions. For example, "meet" may include ascertaining that a parameter matches a predetermined criterion, including that a threshold has been met, or that the parameter equals the predetermined criterion. As used herein, "exceed" may include ascertaining that a parameter surpasses a predetermined criterion, including that a threshold has been passed, surpassed, that the parameter is greater than the predetermined criterion, and so on.

In some embodiments, the determination may happen in real-time as the user interacts with the resource distribution device. By way of non-limiting example, as soon as a user's interaction meets or exceeds the user frequency threshold, the distribution frequency system may determine that the user frequency threshold is met or exceeded. In some embodiments, the determination may happen near real-time. By way of non-limiting example, soon after a user's interaction meets or exceeds the user frequency threshold, the distribution frequency system may determine that the user frequency threshold was met or exceeded.

In some embodiments, the distribution frequency system 130 may determine, based on the user frequency threshold, whether the user interaction frequency meets or exceeds the user frequency threshold in the processor 102.

As shown in block 210, the process flow 200 may include the step of generating, based on the user interaction frequency meeting or exceeding the user frequency threshold, an alert interface component, wherein the alert interface component comprises data associated with the user interaction frequency. As used herein, "generating" may encompass a variety of definitions. For example, "generate" may include creating or producing an object, component, interface, and so on.

In some embodiments, the alert interface component may comprise data associated with the user interaction frequency. For instance, and by way of non-limiting example, the alert interface component may comprise a notification of the interactions, the time and date of the interactions, the amount of resources requested to be distributed, how the resources were distributed (e.g., withdrawn from an account or transferred between accounts), the number of user interactions, and/or the like. In some embodiments, the alert interface component may comprise information regarding the locations of the interactions that took place within the predetermined time period. In some embodiments, the alert interface component may comprise information regarding the locations of recent interactions, which may comprise interactions that took place outside of the predetermined time period. In some embodiments, the alert interface component may comprise information regarding the devices from which the resource distributions were requested.

In some embodiments, the alert interface component may be generated when the user interaction frequency meets or exceeds the user frequency threshold. For instance, and by way of non-limiting example, the alert interface component may be generated when the system receives a number of requests for resource distributions within the predetermined time period that meets or exceeds the predetermined user interaction threshold.

In some embodiments, if the resource distribution request would trigger the system to generate an alert interface component because the user frequency threshold would be met or exceeded, the alert interface component may give the user a chance to review the request for resource distribution. For instance, and by way of non-limiting example, if a particular interaction would trigger the system to generate an alert, the system may prompt the user before the distribution is complete to review the distribution in order to make changes to the resource distribution.

In some embodiments, if the resource distribution request would trigger the system to generate an alert because the predetermined total resource threshold would be met or exceeded, the alert interface component may give the user a chance to review the request for resource distribution. For instance, and by way of non-limiting example, if a particular interaction would trigger the system to generate an alert, the system may prompt the user before the distribution is complete to review the distribution in order to make changes to the resource distribution.

In some embodiments, the distribution frequency system 130 may generate the alert interface component within the processor 102. In some embodiments, the distribution frequency system 130 may store the alert interface component in the memory 104 or the storage device 106.

FIG. 3 illustrates a process flow 300 for determining a total resource value of the plurality of user interactions, in accordance with an embodiment of the invention. In some embodiments, a distribution frequency system (e.g., similar to one or more of the systems described herein with respect to FIGS. 1A-1C) may perform one or more of the steps of process flow 300. For example, a distribution frequency system (e.g., the system 130 described herein with respect to FIGS. 1A-1C) may perform the steps of process flow 300.

In some embodiments, the total resource value may comprise the total amount of resources to be distributed based on the plurality of the user interactions.

In some embodiments, the total resource value may be determined through a summation of the value of the plurality of the user interactions. For instance, if a first user interaction is valued at $500, a second user interaction is valued at $2,000, and a third user interaction is valued at $2,500, then the total resource value would be $5,000.

In some embodiments, the processor 102 of the distribution frequency system 130 may determine the total resource value of the plurality of user interactions.

FIG. 4 illustrates a process flow 400 for transmitting the total resource interface component, in accordance with an embodiment of the invention. In some embodiments, a distribution frequency system (e.g., similar to one or more of the systems described herein with respect to FIGS. 1A-1C) may perform one or more of the steps of process flow 400. For example, a distribution frequency system (e.g., the system 130 described herein with respect to FIGS. 1A-1C) may perform the steps of process flow 400.

As shown in block 402, the process flow 400 may include the step of determining, based on a predetermined total resource threshold, whether the total resource value of the plurality of user interactions meets or exceeds the predetermined total resource threshold.

In some embodiments, the predetermined resource threshold may be a specified resource value of a single user interaction.

As used herein, the predetermined total resource threshold may refer to a specified resource value of the plurality of user interactions. In some embodiments, the predetermined total resource threshold may be determined (e.g., pre-determined) by a resource distribution entity (e.g., financial institution) associated with the user's account. In some embodiments, the predetermined total resource threshold may be predetermined by the resource distribution device's manager. In some embodiments, the predetermined total resource threshold may be predetermined by the user. In some embodiments, the predetermined total resource threshold may be predetermined by a third-party entity such as an agency (e.g., the local police, state investigation agencies, the Federal Bureau of Investigation (FBI), the Securities and Exchange Commission (SEC), and/or the like). In some embodiments, the predetermined total resource threshold may be predetermined by federal law or regulation, state law or regulation, local law or regulation, and/or the like. By way of non-limiting example, the predetermined total resource threshold may be set at $10,000. In some embodiments, a plurality of user interactions that meets or exceeds $10,000 may trigger the distribution frequency system to generate an alert.

In some embodiments, the predetermined total resource threshold may, from time to time, be reevaluated (e.g., reset to a different user interaction threshold) by the entity that initially set the predetermined total resource threshold. In some embodiments, the predetermined total resource threshold may, from time to time, be reevaluated (e.g., reset to a different user interaction threshold) by another entity different than the one that initially set the predetermined total resource threshold.

In some embodiments, the determination may happen in real-time as the user interacts with the resource distribution device. By way of non-limiting example, as soon as a user's interaction meets or exceeds the predetermined total resource threshold, the distribution frequency system may determine that the predetermined total resource threshold is met or exceeded. In some embodiments, the determination may happen near real-time. By way of non-limiting example, soon after a user's interaction meets or exceeds the predetermined total resource threshold, the distribution frequency system may determine that the predetermined total resource threshold was met or exceeded.

In some embodiments, the distribution frequency system 130 may determine, based on the predetermined total resource threshold, whether the total resource value meets or exceeds the predetermined total resource threshold in the processor 102.

As shown in block 404, the process flow 400 may include the step of generating, based on the determination that the total resource value of the plurality of user interactions meets or exceeds the predetermined total resource threshold, a total resource interface component, the total resource interface component comprising data associated with the total resource value of the plurality of user interactions.

In some embodiments, the total resource interface component may comprise data associated with the total resource value of the plurality of interactions. For instance, and by way of non-limiting example, the total resource interface component may comprise a notification of the interactions, the time and date of the interactions, the amount of resources requested to be distributed, how the resources were distributed (e.g., withdrawn from an account or transferred between accounts), the number of user interactions, and/or the like. In some embodiments, the total resource interface component may comprise information regarding the locations of the interactions that took place within the predetermined time period. In some embodiments, the total resource interface component may comprise information regarding the locations of recent interactions, which may comprise interactions that took place outside of the predetermined time period. In some embodiments, the total resource interface component may comprise information regarding the devices from which the resource distributions were requested.

In some embodiments, the total resource interface component may be generated when the total resource value meets or exceeds the predetermined total resource threshold. For instance, and by way of non-limiting example, the total resource interface component may be generated when the system receives a request for resource distribution that meets or exceeds the predetermined total resource threshold.

In some embodiments, if the resource distribution request would trigger the system to generate a total resource interface component because the predetermined total resource threshold would be met or exceeded, the total resource interface component may give the user a chance to review the request for resource distribution. For instance, and by way of non-limiting example, if a particular interaction would trigger the system to generate a total resource interface component, the system may prompt the user before the distribution is complete to review the distribution in order to make changes to the resource distribution.

In some embodiments, the distribution frequency system 130 may generate the total resource interface component within the processor 102. In some embodiments, the distribution frequency system 130 may store the total resource interface component in the memory 104 or the storage device 106.

As show in block 406, the process flow 400 may include the step of transmitting, to a third-party device, the total resource interface component, wherein the total resource interface component configures a graphical user interface of the third-party device, and wherein the third-party device is associated with at least one of the user, a manager of the distribution frequency system or a manager of the entity associated with the user account (e.g., a financial institution), or an agency.

As used herein, transmitting the total resource interface component may comprise transmitting the total resource component over an electronic network to a user device, such as a user device associated with a user of the distribution frequency system, a manager of the distribution frequency system, a third-party device, and/or the like. In some embodiments, the total resource interface component may be transmitted from the distribution frequency system to a user device associated with the real user of the user account. In this manner, the distribution frequency system may indicate to the real user of the user account that a misappropriation attempt has occurred on the user account and may request the real user to complete a variety of tasks. In some embodiments, the variety of tasks may comprise at least one of requesting the user to input new authentication credentials for the user account (i.e., change the authentication credentials for the user account), indicate allowance or denial of the resource distribution request (e.g., where the real user may wish the distribution to occur because the requesting party is a trusted third party), contact the manager of the resource distribution device, contact the manager of the financial institution associated with the user account, and/or the like. In some embodiments, the distribution frequency system itself may automatically transmit an indication and/or the total resource interface component to the manager of the resource distribution device or the manager of the financial institution associated with the user account indicating that the request for resource distribution has occurred, without the real user's interference and/or approval.

In some embodiments, a third-party device may comprise a device associated with the user, a manager, or an agency. In some embodiments, a device may comprise a mobile telephone, a personal computer, an electronic tablet, a workstation, a kiosk, a financial terminal, a server, and/or the like. In some embodiments, the device may be associated with the user. In some embodiments, a manager may comprise a manager of the resource distribution entity (e.g., financial institution), a manager of the resource distribution device, a manager of the user's account, and/or the like. In some embodiments, an agency may comprise the local police, state investigation agencies, the Federal Bureau of Investigation (FBI), the Securities and Exchange Commission (SEC), and/or the like. In some embodiments, the total resource interface component may be transmitted to any combination of user devices, manager devices, or agency devices.

In some embodiments, the distribution frequency system 130 may transmit the total resource interface component over the network 110. In some embodiments, the distribution frequency system 130 may transmit the total resource interface component over the network 110 from the low-speed expansion port 114. In some embodiments, the distribution frequency system 130 may transmit the total resource interface component through the network 110 to the end-point device 140 (e.g., the user device, the resource distribution device, and/or the like).

FIG. 5 illustrates a process flow 500 for transmitting the alert interface component, in accordance with an embodiment of the invention. In some embodiments, a distribution frequency system (e.g., similar to one or more of the systems described herein with respect to FIGS. 1A-1C) may perform one or more of the steps of process flow 500. For example, a distribution frequency system (e.g., the system 130 described herein with respect to FIGS. 1A-1C) may perform the steps of process flow 500.

As shown in block 502, the process flow 500 may include the step of transmitting, to a third-party device, the alert interface component, wherein the alert interface component configures a graphical user interface of the third-party device.

In some embodiments, the alert interface component may be transmitted from the distribution frequency system to a user device associated with the real user of the user account. In this manner, the distribution frequency system may indicate to the real user of the user account that a misappropriation attempt has occurred on the user account and may request the real user to complete a variety of tasks. In some embodiments, the variety of tasks may comprise at least one of requesting the user to input new authentication credentials for the user account (i.e., change the authentication credentials for the user account), indicate allowance or denial of the resource distribution request (e.g., where the real user may wish the distribution to occur because the requesting party is a trusted third party), contact the manager of the resource distribution device, contact the manager of the financial institution associated with the user account, and/or the like. In some embodiments, the distribution frequency system itself may automatically transmit an indication and/or the alert interface component to the manager of the resource distribution device or the manager of the financial institution associated with the user account indicating that the request for resource distribution has occurred, without the real user's interference and/or approval.

In some embodiments, the alert interface component may comprise a deterrence action. In some embodiments, the deterrence action may be transmitted simultaneously with the alert interface component. In some embodiments, the deterrence action may comprise forcing the resource distribution device to automatically decline the transaction of concern. In some embodiments, the deterrence action may comprise shutting down the resource distribution device for a specified amount of time (e.g., 30 minutes, one hour, two hours, 24 hours, and/or the like). In some embodiments, the deterrence action may comprise shutting down the resource distribution device until authorized personnel (e.g., a manager of the resource distribution device, a manager of the financial institution associated with the user account, a member of the agency, and/or the like) reactivates the resource distribution device.

In some embodiments, the deterrence action may comprise auto-declining resource distribution requests that are indicative of misappropriation. In some embodiments, the deterrence action may comprise an auto-decline rule to lock out resource distribution requests for a specified amount of time (e.g., 30 minutes, one hour, two hours, 24 hours, and/or the like).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining resource misappropriation based on distribution frequency, the system comprising:

at least one memory device with computer-readable program code stored thereon;

at least one communication device;

at least one processing device operatively coupled to the at least one memory device and the at least one communication device, wherein executing the computer-readable code is configured to cause the at least one processing device to:

receive, based on a receipt of a plurality of user interactions from one or more resource distribution devices of a plurality of resource distribution devices, a user interaction frequency, wherein the user interaction frequency comprises the plurality of user interactions and a total resource value over a current predetermined time period, and wherein each of the plurality of user interactions comprises a resource distribution request comprising a resource value from an account associated with a user from a start to an end of the current predetermined time period;

store the plurality of user interactions;

compare, in parallel to the receipt of the user interaction frequency during the current predetermined time period, the user interaction frequency with a user frequency threshold, wherein the user frequency threshold comprises a predetermined user interaction threshold over the predetermined time period and a predetermined total resource value threshold, and the predetermined user interaction threshold and the predetermined total resource value threshold are predetermined by an entity associated with the account;

determine, based on the user frequency threshold, whether the user interaction frequency meets or exceeds the user frequency threshold;

determine, based on the total resource value, the total resource value meets or exceeds the predetermined total resource value threshold;

determine, based on the user interaction meeting or exceeding the user frequency threshold, the current user interaction is a misappropriation in real time or near real time to receiving the current user interaction that meets the user frequency threshold; and generate, based on the user interaction frequency meeting or exceeding the user frequency threshold, an alert interface component, wherein the alert interface component comprises data associated with the user interaction frequency, wherein the alert interface component comprises a request for a user input of a user associated with the plurality of user interactions, and wherein the request for the user input comprises a request to modify the resource value in the current user interaction;

transmit the alert interface component to a user device associated with the user;

receive, from the user device, the user input comprising an update to the current user interaction;

update the total resource value in response to the user input; and determine, based on the update to the total resource value, the total resource value is less than the predetermined total resource value threshold.

2. The system of claim 1, wherein the predetermined user interaction threshold comprises at least one of one interaction, two interactions, three interactions, four interactions, or five interactions.

3. The system of claim 1, wherein data associated with the plurality of user interactions comprises a resource value of each interaction.

4. The system of claim 3, wherein the processing device is configured to determine a total resource value of the plurality of user interactions, and wherein the total resource value is based on each of the resource value of each interaction.

5. The system of claim 4, wherein the processing device is further configured to:

determine, based on a predetermined total resource threshold, whether the total resource value of the plurality of user interactions meets or exceeds the predetermined total resource threshold;

generate, based on the determination that the total resource value of the plurality of user interactions meets or exceeds the predetermined total resource threshold, a total resource interface component, the total resource interface component comprising data associated with the total resource value of the plurality of user interactions; and transmit, to a third-party device, the total resource interface component, wherein the total resource interface component configures a graphical user interface of the third-party device, and wherein the third-party device is associated with at least one of the user, a manager, or an agency.

6. The system of claim 1, wherein each of the plurality of user interactions comprises a request for a resource distribution.

7. The system of claim 1, wherein at least one user interaction of the plurality of user interactions comprises an attempt for a resource distribution.

8. The system of claim 1, wherein the account associated with the user comprises a plurality of resource distribution accounts.

9. The system of claim 8, wherein each resource distribution of the plurality of the resource distribution accounts is associated with a plurality of resource distribution instruments.

10. The system of claim 1, wherein the processing device is further configured to transmit, to a third-party device, the alert interface component, wherein the alert interface component configures a graphical user interface of the third-party device.

11. The system of claim 10, wherein the third-party device comprises a plurality of third-party devices.

12. A computer program product for determining resource misappropriation based on distribution frequency, wherein the computer program product comprises at least one non-transitory computer-readable medium having computer-readable program code portions embodied therein, the computer-readable program code portions which when executed by a processing device are configured to cause the processor to:

receive, based on a receipt of a plurality of user interactions from one or more resource distribution devices of a plurality of resource distribution devices, a user interaction frequency, wherein the user interaction frequency comprises the plurality of user interactions and a total resource value over a current predetermined time period, and wherein each of the plurality of user interactions comprises a resource distribution request comprising a resource value from an account associated with a user from a start to an end of the current predetermined time period;

store the plurality of user interactions;

compare, in parallel to the receipt of the user interaction frequency during the current predetermined time period, the user interaction frequency with a user frequency threshold, wherein the user frequency threshold comprises a predetermined user interaction threshold over the predetermined time period and a predetermined total resource value threshold, and the predetermined user interaction threshold and the predetermined total resource value threshold are predetermined by an entity associated with the account;

determine, based on the user frequency threshold, whether the user interaction frequency meets or exceeds the user frequency threshold;

determine, based on the total resource value, the total resource value meets or exceeds the predetermined total resource value threshold;

determine, based on the user interaction meeting or exceeding the user frequency threshold, the current user interaction is a misappropriation in real time or near real time receiving the current user interaction that meets the user frequency threshold; and generate, based on the user interaction frequency meeting or exceeding the user frequency threshold, an alert interface component, wherein the alert interface component comprises data associated with the user interaction frequency, wherein the alert interface component comprises a request for a user input of a user associated with the plurality of user interactions, and wherein the request for the user input comprises a request to modify the resource value in the current user interaction;

transmit the alert interface component to a user device associated with the user;

receive, from the user device, the user input comprising an update to the current user interaction;

update the total resource value in response to the user input; and determine, based on the update to the total resource value, the total resource value is less than the predetermined total resource value threshold.

13. The computer program product of claim 12, wherein the predetermined user interaction threshold comprises at least one of one interaction, two interactions, three interactions, four interactions, or five interactions.

14. The computer program product of claim 12, wherein the processing device is further configured to transmit, to a third-party device, the alert interface component, wherein the alert interface component configures a graphical user interface of the third-party device.

15. The computer program product of claim 14, wherein the third-party device comprises a plurality of third-party devices, and wherein at least one of the third-party devices is associated with at least one of the user, a manager, or an agency.

16. The computer program product of claim 12, wherein the account associated with the user comprises a plurality of resource distribution accounts.

17. A computer-implemented method for determining resource misappropriation based on distribution frequency, the computer-implemented method comprising:

receiving, based on a receipt of a plurality of user interactions from one or more resource distribution devices of a plurality of resource distribution devices, a user interaction frequency, wherein the user interaction frequency comprises the plurality of user interactions and a total resource value over a current predetermined time period, and wherein each of the plurality of user interactions comprises a resource distribution request comprising a resource value from an account associated with a user from a start to an end of the current predetermined time period;

storing the plurality of user interactions;

comparing, in parallel to the receipt of the user interaction frequency during the current predetermined time period, the user interaction frequency with a user frequency threshold, wherein the user frequency threshold comprises a predetermined user interaction threshold over the predetermined time period and a predetermined total resource value threshold, and the predetermined user interaction threshold and the predetermined total resource value threshold are predetermined by an entity associated with the account;

determining, based on the user frequency threshold, whether the user interaction frequency meets or exceeds the user frequency threshold;

determining, based on the total resource value, the total resource value meets or exceeds the predetermined total resource value threshold;

determining, based on the user interaction meeting or exceeding the user frequency threshold, the current user interaction is a misappropriation in real time or near real time to receiving the current user interaction that meets the user frequency threshold; and generating, based on the user interaction frequency meeting or exceeding the user frequency threshold, an alert interface component, wherein the alert interface component comprises data associated with the user interaction frequency, wherein the alert interface component comprises a request for a user input of a user associated with the plurality of user interactions, and wherein the request for the user input comprises a request to modify the resource value in the current user interaction;

transmit the alert interface component to a user device associated with the user;

receive, from the user device, the user input comprising an update to the current user interaction;

update the total resource value in response to the user input; and determine, based on the update to the total resource value, the total resource value is less than the predetermined total resource value threshold.

18. The computer-implemented method of claim 17, wherein the predetermined user interaction threshold comprises at least one of one interaction, two interactions, three interactions, four interactions, or five interactions.

19. The computer-implemented method of claim 17, the computer-implemented method further comprising transmitting, to a third-party device, the alert interface component, wherein the alert interface component configures a graphical user interface of the third-party device.

20. The computer-implemented method of claim 19, wherein the third-party device comprises a plurality of third-party devices, and wherein at least one of the third-party devices is associated with at least one of the user, a manager, or an agency.

* * * * *